United States Patent [19]

Baliga et al.

[11] Patent Number: 5,497,003
[45] Date of Patent: Mar. 5, 1996

[54] PYROELECTRIC DETECTOR ARRAY WITH OPTICAL FILTER ELEMENTS

[75] Inventors: Shankar B. Baliga, Bethpage; George Rullman, Dix Hills, both of N.Y.

[73] Assignee: Servo Corporation Of America, Hicksville, N.Y.

[21] Appl. No.: 389,153

[22] Filed: Feb. 15, 1995

[51] Int. Cl.⁶ .................... G01J 3/36; G01J 5/08
[52] U.S. Cl. ............. 250/338.3; 250/339.02; 250/339.14; 250/339.15
[58] Field of Search ............ 250/338.3, 339.14, 250/339.02, 339.15, 343, 349, DIG. 1

[56] References Cited

U.S. PATENT DOCUMENTS

| | | | |
|---|---|---|---|
| 5,095,913 | 3/1992 | Yelderman et al. | 250/343 |
| 5,130,544 | 7/1992 | Nilsson | 250/343 |
| 5,281,817 | 1/1994 | Yelderman et al. | 250/343 |
| 5,300,778 | 4/1994 | Norkus et al. | 250/349 |

FOREIGN PATENT DOCUMENTS

| | | | |
|---|---|---|---|
| 58-058425 | 4/1983 | Japan | 250/338.3 |
| 58-058441 | 4/1983 | Japan | 250/338.3 |
| 54-008717 | 1/1990 | Japan | 250/339.15 |

*Primary Examiner*—Constantine Hannaher
*Assistant Examiner*—Virgil O. Tyler
*Attorney, Agent, or Firm*—Kane, Dalsimer, Sullivan, Kurucz, Levy, Eisele and Richard

[57] ABSTRACT

The apparatus is a pyroelectric detector array with an optical filter. A plurality of pyroelectric detector elements are arranged on a common substrate and an optical filter is placed immediately adjacent to the pyroelectric detector elements. The optical filter includes a plurality of filter elements, each with a preselected optical passband. The optical filter is arranged so that radiation incident on a pyroelectric detector element passes through a respective unique filter element.

8 Claims, 3 Drawing Sheets

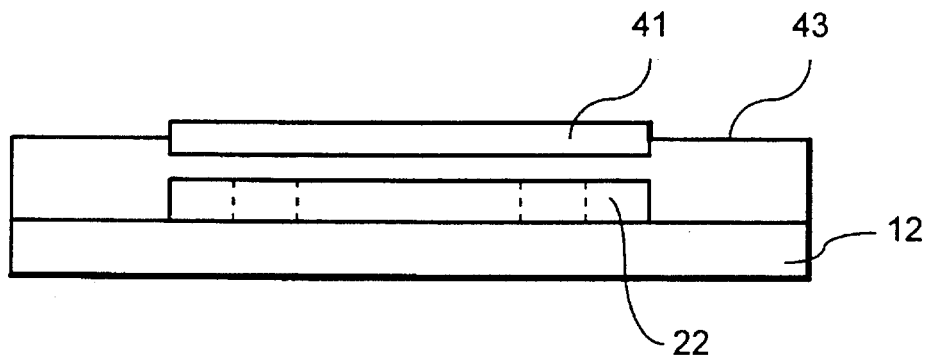
F I G. 5
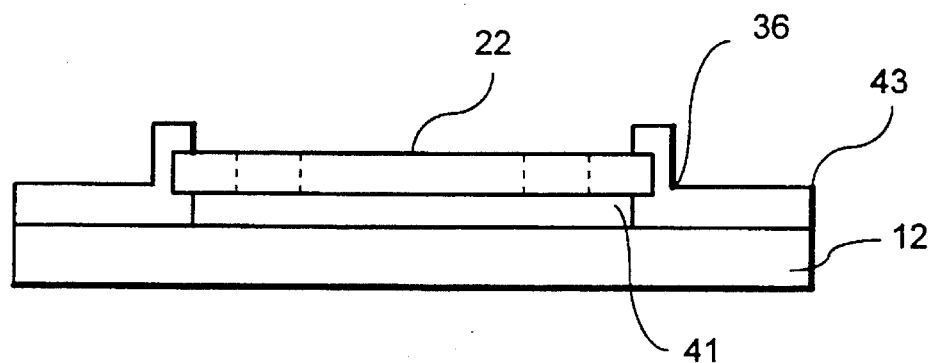
F I G. 6
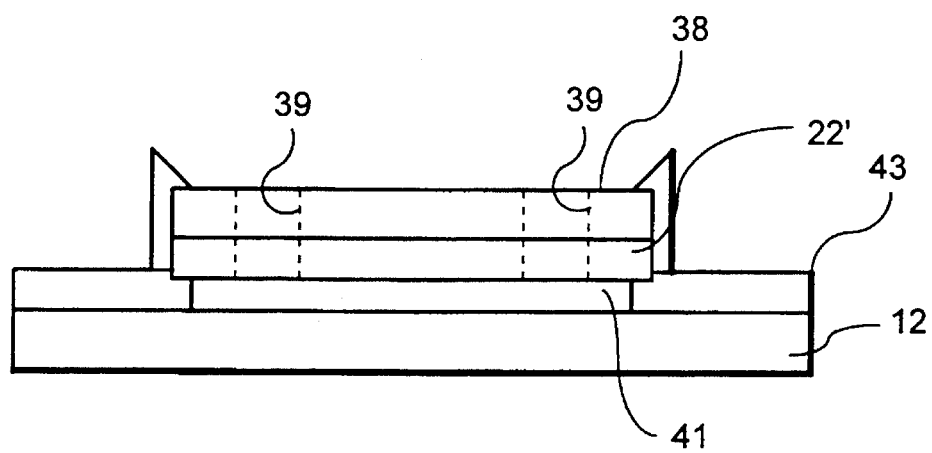
F I G. 7

PYROELECTRIC DETECTOR ARRAY WITH OPTICAL FILTER ELEMENTS

BACKGROUND OF THE INVENTION

1. Field of the Invention

The present invention pertains to a pyroelectric detector array where the detector elements are arranged in a circle or other geometric shape. An optical filter made of plastic or other suitable material is mounted directly above the ring of detector elements so that individual optical filter elements of different passbands can be mounted directly above and in proximity to the detector elements.

2. Description of the Prior Art

With increased industrialization, the detection, identification and measurement of gases is becoming more and more important. Air pollution is one area of concern. Other fields requiring gas detection and monitoring include natural gas transmission and distribution, bio-medical instrumentation, and various processes which require both safety equipment as well as process monitoring and control. Chemical information obtained continuously in real time can lead to improved product quality. Further, continuous gas concentration measurements can lead to real-time information on other gas properties, for example, the energy content of natural gas.

Optical techniques are especially suited for many of these applications. Many gases can be uniquely identified by their optical absorption signature when taken over a wide wavelength range. In a mixture of gases, the individual absorption peaks can be measured, or in the case of overlapping spectra, the proportion of each gas can be calculated from prior knowledge of the absorption strengths. Optical techniques can also be truly on-line and easily adapted to remote sensing techniques when necessary. In the optical spectrum, the infrared range is well-suited for absorption measurements and instruments based on absorption, since many gases have their absorption bands in this region. The advantages of an optical absorption technique can often be utilized to the fullest only if the entire wavelength range of interest is available for study.

Several manufacturers fabricate single element pyroelectric detectors. These are housed in transistor type packages such as TO-5 or TO-8. Wavelength discrimination for gas detection and measurement is via the optical filter installed in the cover. Detector arrays which are currently on the market are typically linear arrays (for example, Servo Corp. Model 1508 and 1508 VM). These are suitable only for dispersive type instruments which require optical dispersive elements which can be bulky, have reduced optical throughput, and be expensive for the long wave infrared region. The prior art pyroelectric detector arrays are not suitable for incorporation into gas monitoring, leak detection, and process control instruments.

More specifically, FIGS. 1 and 2 are electrical schematics of single element pyroelectric detectors 100 and 101, operating in the voltage and current modes, respectively. The single element pyroelectric detector includes a specially processed lithium tantalate (LTO) crystal 102 coupled with either voltage mode or current mode preamplifiers. In the voltage mode, a low-noise, low gate-leakage current JFET impedance buffer 103 is used, which produces a low impedance output signal capable of being interfaced to standard electronic circuitry outside the package. In the current mode, as illustrated in FIG. 2, an integral hybridized preamplifier 104 is used which converts the current produced by the crystal 102 to an output voltage. The frequency response is determined by the crystal capacitance and the high value resistor 105. In the voltage mode, as shown in FIG. 1, the resistor 106 is placed in parallel with the crystal, whereas in the current mode, the resistor 105 is placed in the feedback loop of the operational amplifier 104. FIGS. 1 and 2 show the basic configuration of these two operating modes: $C_d$ is the crystal capacitance modeled in parallel with the crystal as a current source, $R_i$ and $R_f$ are the high value resistors, and $C_s$ is the stray capacitance.

The pyroelectric detector 100 or 101 operates on the principle that a change in temperature of the pyroelectric element upon irradiation causes a change in the charge on its surface. The change in charge is related to the temperature change by:

$$\Delta Q = \rho A \Delta T_x$$

Where $\rho$ is the pyroelectric coefficient, A is the detector area, and $\Delta T_x$ is the change in temperature of the pyroelectric element.

The actual measurement made with the circuits shown in FIGS. 1 and 2 is the rate of change of charge or the pyroelectric current. The detectors 100, 101 therefore measure the rate of temperature rise. They are thermal detectors as contrasted to photon detectors which have a band gap mechanism for photon detection. The spectral response is determined by the nature of the top electrode or the absorptive coating applied to the top electrode. For wideband spectral absorption and increased sensitivity, the top electrode is usually blackened using black paints, inks, evaporated black coatings or other selective absorbers. Since the detector is thermal in nature, the nature of the crystal mount and the rate of heat drain from the crystal is important in determining the device characteristics.

Lithium tantalate (LTO) is the preferred pyroelectric material for many applications since it is inert, rugged, with a high Curie temperature (610° C.), provides an adequate signal-to-noise ratio and is stable over temperature. The single element detector usually consists of the sensing element, JFET buffer or op-amp, resistor and IR filter window integrated into a small hermetically sealed package, typically a TO-5 style transistor package which also affords a high degree of electrostatic shielding. The single element detectors can be built in production quantities for commercial products, or built and qualified to high reliability requirements for use on satellites for earth sensor applications or special purpose military systems.

OBJECTS AND SUMMARY OF THE INVENTION

It is therefore an object of this invention to provide a pyroelectric detector array without the need for an optical dispersive element.

It is therefore a further object of this invention to provide a pyroelectric detector array which has an increased optical throughput.

It is therefore a still further object of this invention to provide a pyroelectric detector array which is substantially less bulky than those found in the prior art.

It is therefore a still further object of this invention to provide a pyroelectric detector array which is less expensive than those found in the prior art.

It is therefore a still further object of this invention to provide a pyroelectric detector array which is suitable for gas monitoring.

It is therefore a still further object of this invention to provide a pyroelectric detector array which is suitable for gas leak detection.

It is therefore a still further object of this invention to provide a pyroelectric detector array which is suitable for process control instruments.

It is therefore a final object of this invention to provide a pyroelectric detector array which is flexible in its configuration and application, depending upon the wavelength of interest.

These and other objects are achieved by the present invention which is a pyroelectric detector array where the n detector elements are arranged in a circle (n is typically equal to 8) or other geometric shape. An optical filter holder made of plastic or other suitable material is mounted directly above and in proximity to the detector elements. Each pyroelectric element in this array can thus detect a different infrared wavelength range. Selection of proper optical filters in such an array permits the unique discrimination and quantification of absorbing gases, gas mixes or liquids introduced into a sample chamber in front of the detector array. The detector and filter elements along with interfacing electronics such as field effect transistors (FETs) and resistors are mounted in a single package with a broadband infrared window.

The circular arrangement of wavelength selective detector elements results in a non-dispersive instrument with greatly simplified optics (due to the circular symmetry). Such an array is also less expensive than a plurality of individual detectors mechanically held in a circle. Further, the plurality of detector elements in a single package can be placed much closer, that is, in a tighter ring, than individual pyroelectric detectors in TO style packages. This further simplifies the design and fabrication of optical elements in the instrument and provides for larger optical throughput.

An additional variation on this invention includes an optical filter holder attached to the outside of the detector array package. The detector elements are arranged in a circle as in the previously described embodiment. The plastic filter holder and optical filters are mounted to the outside of the array package by suitable mechanical means. This provides for the easy replacement and switching of the entire filter holder with the filters. In a still further variation of the invention, the optical filters are mounted in the filter holder by a clamping arrangement which permits their easy replacement one by one. This is invaluable in prototype work to develop a particular gas monitoring instrument. It also aids in the manufacturing, service and repair, and filter upgrade when a more suitable filter is available. In the external filter configuration, the packaged detector array can be fabricated and tested prior to mating with the optical filters.

BRIEF DESCRIPTION OF THE DRAWINGS

Further objects and advantages of the invention will become apparent from the following description and claims, and from the accompanying drawings, wherein:

FIG. 5 is a side plane view showing the relationship of the optical filter holder and the detector of the present invention.

FIG. 6 is a side plan view of a second embodiment of the detector of the present invention showing the optical filter holder clamped to the detector.

FIG. 7 is a side plan view of a third embodiment of the detector of the present invention showing individual filter elements clamped to the detector.

DETAILED DESCRIPTION OF THE PREFERRED EMBODIMENT

Figure 3:
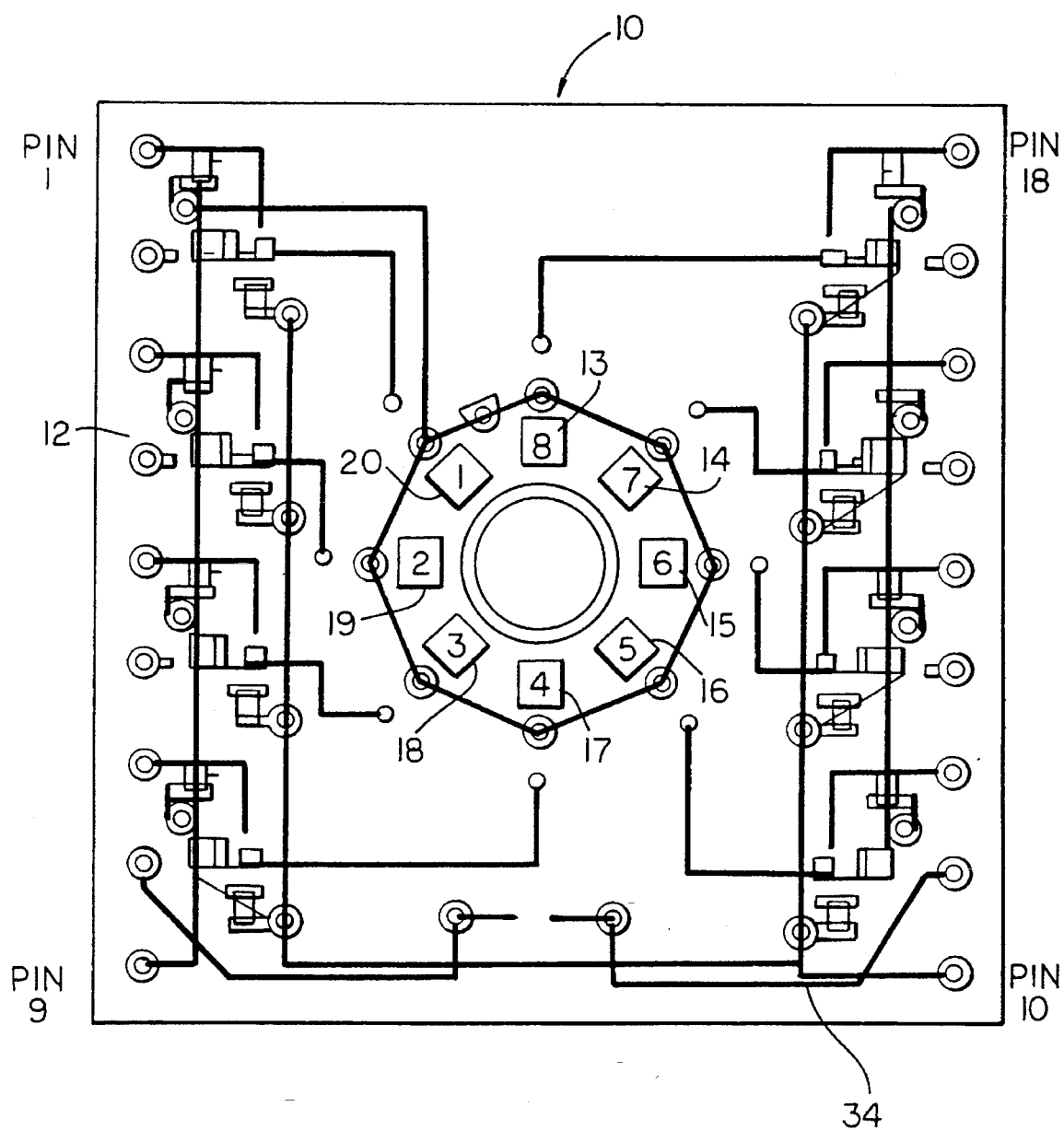
FIG. 3 is a schematic of the layout of the detector array of the present invention.

Referring now to the drawings in detail wherein like numerals indicate like elements throughout the several views, one sees that FIG. 3 is a schematic of the detector 10 of the present invention.

Detector 10 includes circuit board 12 with eight detector elements 13–20 arranged in a circular configuration. While the thermal detector 10 is illustrated with eight detector elements 13–20, the number of detector elements is typically two to eight, and can be increased further if necessary. Similarly, geometric configurations other than a circle are possible. Detector elements 13–20 are typically one square millimeter in size.

Figure 1:
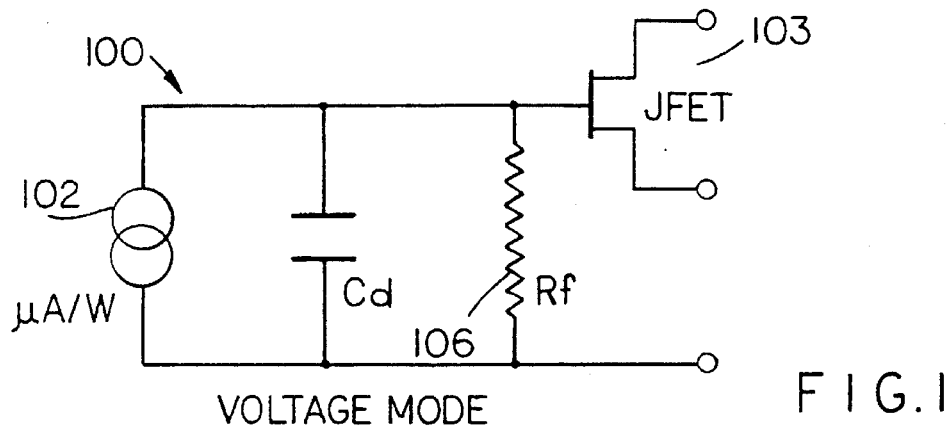
FIG. 1 is a schematic of the detector of the prior art in the voltage mode.
Figure 2:
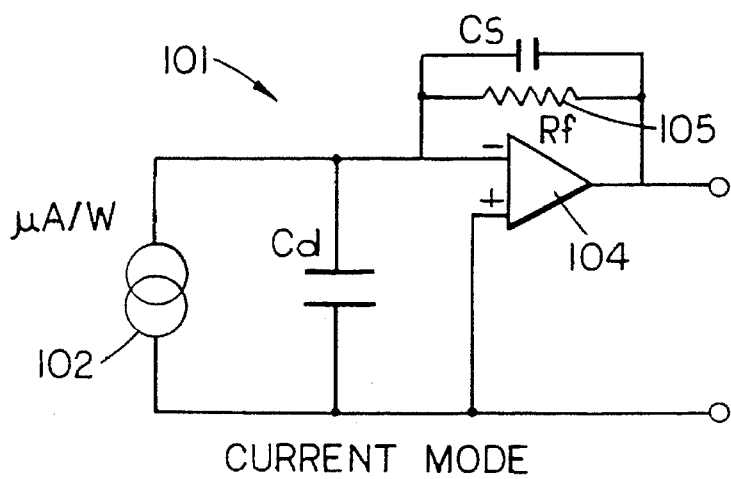
FIG. 2 is a schematic of the detector of the prior art in the current mode.
Figure 4A:
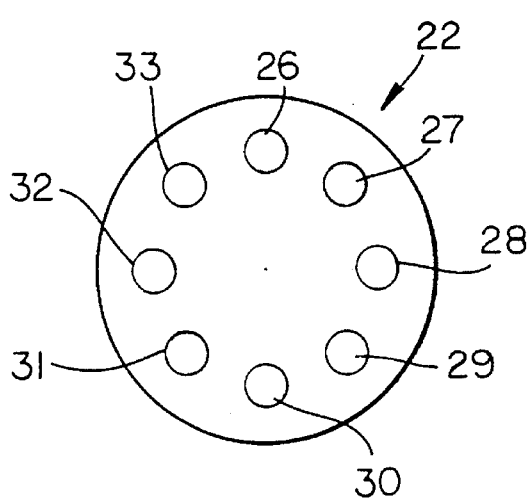
FIGS. 4a and 4b are schematics of the optical filter holder and the optical filter elements of the present invention.
Figure 4B:
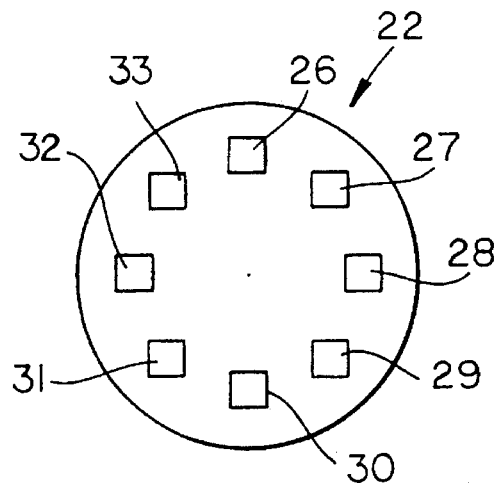

Referring now to FIGS. 4a, 4b and 5, an optical filter holder 22 is disposed immediately over and adjacent to circuit board 12. Optical filter holder 22 acts as a cover to the detector 10 through which all the pyroelectric detector elements 13–20 are illuminated. Optical filter holder 22 includes eight narrow band optical filter elements 26–33 which correspond to the eight pyroelectric (optical) detector elements 13–20 and are arranged so that electromagnetic radiation (light) reaching each respective pyroelectric detector element 13–20 passes through a respective unique optical filter element 26–33. These optical filter elements 26–33 are held in place by glue or epoxy onto the optical filter holder 22. As each different optical filter element 26–33 has a different narrow optical passband, each pyroelectric detector element 13–20 on circuit board 12 thereby detects a different infrared wavelength range. Selection of the passbands of the various optical filter elements 26–33 in such an array permits the unique discrimination and quantification of absorbing gases, gas mixes or liquids introduced into a sample chamber (not shown) in front of the thermal detector 10. The multiple pyroelectric detector elements 13–20 and optical filter elements 26–33 along with interfacing electronics 34 for all eight channels (both voltage mode and current mode configurations are available) are mounted in a single package with a broadband infrared window. Additionally, it is possible to provide for a temperature sensing element such as a thermistor (not shown) inside the package.

The optical filter holder 22 also acts as an optical waveguide for the infrared energy, and prevents optical crosstalk which occurs when infrared energy reaches a pyroelectric detector element 13–20 by optical paths other than through the respective filter element 26–33 above it. The circular arrangement of pyroelectric detector elements 13–20 also has the advantage that the incident infrared energy can be distributed uniformly and with less losses over the circular array. The circular arrangement of pyroelectric detector elements 13–20 (which are wavelength selective due to the range of preselected passbands of optical filter elements 26–33) further results in a non-dispersive instrument with greatly simplified optics. Such an array is also less expensive than that of a plurality of individual detectors held mechanically in a circle. Additionally, the plurality of pyroelectric detector elements 13–20 in a single package on circuit board 12 can be placed much closer (that is, in a tighter ring) than a similar plurality of individual pyroelectric optical detector elements in TO style packages. This further simplifies the design and fabrication of pyroelectric detector elements 13–20 of thermal detector 10 and provides for a larger optical throughput.

one or more channels in such an array can be used as a total channel by not installing a filter or using a wide band infrared window above one or more pyroelectric detector elements 13–20. This channel then monitors the total infrared energy in the system. The package usually contains a broadband infrared window 41 such as AR coated germanium or zinc selenide over the entire thermal detector 10 built or installed in the package cover 43. The packages are hermetic. Additionally, the infrared window can be electrically connected to the package cover when the window is made of electrically conducting material in order to offer shielding against electromagnetic and radio frequency interference. It is also possible to have the narrow band filters mounted outside the package, which makes their installation and replacement easier. The optical waveguide design in this case needs to be more sophisticated and precise, to provide the optical throughput and minimize the optical cross-talk.

For dispersive type instruments, linear arrays of 8, 16, or more detectors can be used. The detector element or pixel size is typically from 0.5 to 2.0 millimeter which, along with the preamplifiers in the package, determine the package size and number of pins. The eight-element package is currently one inch square for both circular and linear arrays, while arrays with fewer elements can be packaged into smaller packages. The performance of an individual detector in an array is virtually identical to that of a single detector, so that an array of detectors in a package can be used at a saving in cost, and the simpler optical design similarly leading to reduced costs.

As shown in FIG. 6, an additional embodiment of thermal detector 10 includes an optical filter holder 22 which is attached to the outside of the detector array package. The plurality of pyroelectric detector elements 13–20 are arranged in a circular configuration as shown in the previous embodiment. The plastic filter holder 22 and optical filter elements 13–20 epoxied to the holder 22 are mounted to the outside of the array package 12 via mechanical means such as detent arrangement 36. This provides for the easy replacement and switching of the entire filter holder with the filter elements.

As shown in FIG. 7, in a still further embodiment of the thermal detector 10, a plurality of individual optical filter elements are mounted in the filter holder 22' by a clamping cover 38 (including cut-outs 39 for light to pass therethrough) which clamps the filter holder 22' to the broadband infrared window 41 which, in turn, is held in place by package cover 43. This configuration permits easy replacement of the optical filter elements one-by-one as required by the specific application. In this embodiment, the optical filter elements are held in place by clamping cover 38 rather than by glue. This is particularly useful in prototype work to develop a particular gas monitoring instrument. It also aids in the manufacturing, service and repair, and filter upgrade when a more suitable filter is available. In the external filter configuration, the packaged detector or array can be fabricated and tested prior to mating with the optical filters.

In order for the user to use gas detectors or monitors based on pyroelectric arrays, a source and a gas cell (not shown) are required. The source is usually a resistive array that is heated to high temperatures (800° C. or more) and optically coupled to the detector array via the gas cell. Since pyroelectric detectors measure only a rate of change, it is necessary to chop, pulse or modulate the source output. The ability to modulate the source eliminates the need for a mechanical chopper or shutter, and results in a more compact design. The gas cell provides the path length of gas required for absorption, and may have inlets and outlets for gas flow. Its design is also important for efficient coupling of the optical energy from the source to the detector array to maximize the signal-to-noise ratio. Whereas the gas pressure and path length govern the absorptance, a good signal-to-noise ratio also depends on adequate energy reaching the detector elements. The technology is not limited to measurements on gases since measurements of liquids and processes occurring in liquids can also be monitored. For remote sensing applications the optical energy can be transported to the sampling cell or immersion probe and back using fiber optics. For example, the use of fluoride and chalcogenide infrared transmitting fibers permits the use of infrared wavelengths up to 4 and 11 microns, respectively.

An example of an application of detector 10 is in identification, quantification and discrimination of individual hydrocarbons and other atmospheric constituents. Discrimination between hydrocarbons may be achieved by measurements over a broad spectral range. Propane has absorption in the 6.5 to 7.2 micron wavelength range, methane has absorption in the 7.4 to 8.4 micron wavelength range and both hydrocarbons absorb strongly in the 3.3 to 3.5 micron wavelength range. Hence, by using a detector array having the above passbands and blocking the outside of these passbands, the individual gas species can be identified and measured. The additional channels can be used to monitor the combination and overtone bands of the hydrocarbons at shorter wavelengths, if desired. Even in the case where the absorption bands of the gases overlap, the individual species can be measured, provided the absorption strength of each gas is known for the passbands of the filters used.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A thermal detector comprising:

a substrate;

a plurality of pyroelectric detector elements on said substrate;

electronics on said substrate for interfacing outputs of said plurality of pyroelectric detector elements;

a plurality of optical filter elements, each of said optical filter elements having a different preselected optical passband and corresponding to one of said pyroelectric detector elements; and means for holding said plurality of optical filter elements immediately adjacent to said pyroelectric detector elements so that incident radiation striking any one of said optical filter elements passes only through to the pyroelectric detector element in correspondence with said one optical filter element and does not pass through to any other of said pyroelectric detector elements of said plurality.

2. The thermal detector of claim 1 further including an optical filter holder which holds all of said optical filter elements and wherein said means for holding comprises a detent means for holding said optical filter holder.

3. The thermal detector of claim 1 further including an optical filter holder which holds all of said optical filter elements and wherein said means for holding comprises a clamping means for holding said optical filter holder.

4. The thermal detector of claim 1 wherein said means for holding includes a clamping means for each of said optical filter elements.

5. The thermal detector of claim 2 wherein said optical filter holder includes an infrared window.

6. The thermal detector of claim 5 wherein said infrared window is comprised of broadband anti-reflection coated germanium.

7. The thermal detector of claim 5 wherein said plurality of pyroelectric detector elements is arranged in a circular configuration.

8. The thermal detector of claim 7 wherein said plurality of pyroelectric detector elements includes eight pyroelectric detector elements.

* * * * *